F. C. REYNOLDS.
LAWN TRIMMER.
APPLICATION FILED JUNE 21, 1909.
964,882.
Patented July 19, 1910.
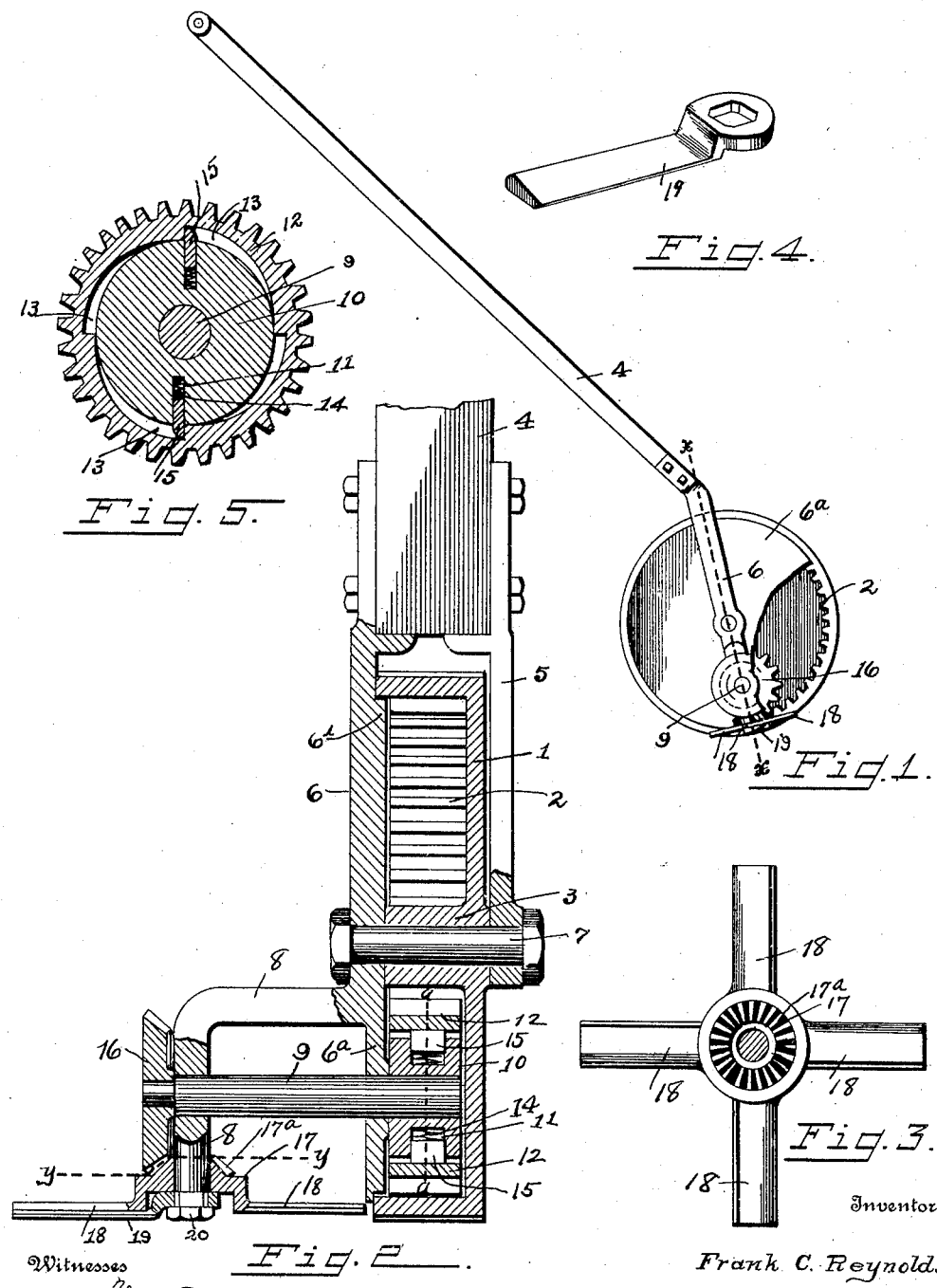
Witnesses
Carl Stoughton
A. L. Phelps
Inventor
Frank C. Reynolds.
By C. C. Shepherd
Attorney

UNITED STATES PATENT OFFICE.

FRANK C. REYNOLDS, OF COLUMBUS, OHIO, ASSIGNOR TO JACOB G. TUSSING AND ELZA T. TUSSING, OF COLUMBUS, OHIO.

LAWN-TRIMMER.

964,882.  Specification of Letters Patent.  Patented July 19, 1910.

Application filed June 21, 1909. Serial No. 503,343.

*To all whom it may concern:*

Be it known that I, FRANK C. REYNOLDS, a citizen of the United States, residing at Columbus, in the county of Franklin and State of Ohio, have invented certain new and useful Improvements in Lawn-Trimmers, of which the following is a specification.

My invention relates to the improvement of lawn trimmers, and the objects of my invention are to provide an improved construction of lawn trimming device, particularly adapted for the trimming of lawn edges or borders where the same lie adjacent to walks, paths or driveways and where the grass cannot be readily cut by an ordinary lawn mower; to provide an improved lawn trimmer adapted to be used in conjunction with interchangeable cutters or knives and cutter bars and to produce other improvements the details of which will be more fully pointed out hereinafter. These objects I accomplish in the manner illustrated in the accompanying drawing, in which:

Figure 1 is a side elevation of my improved lawn edge trimmer showing a portion of one of the wheel side plates broken away, Fig. 2 is an enlarged sectional view on line $x$—$x$ of Fig. 1, Fig. 3 is a plan view of the detachable cutting device, on line $y$—$y$ of Fig. 2. Fig. 4 is a detail view in perspective of the detachable cutter bar, and, Fig. 5 is an enlarged sectional view on line $a$—$a$ of Fig. 2.

Similar numerals refer to similar parts throughout the several views.

1 represents the ground wheel of my device, which is of the cup shape indicated and the interior of which is formed with gear teeth, as shown at 2. The wheel body has formed integral therewith a central hub member 3.

4 represents a handle which is of suitable length and which has its inner end portion secured, as shown, between a bar 5 which extends on the closed side of the wheel 1 and a bar 6 which extends on the opposite side of said wheel 1. The bar 6 has formed therewith a disk-like plate 6ª which projects within the open face of the wheel 1. The bars 5 and 6 are pivoted on the end portions of a horizontal pivot pin 7, which extends through a central opening of the hub 3. The combined bar and plate 6ª has formed therewith, at a point below the pivot pin 7, an outwardly and thence downwardly extending arm 8, the lower portion of which is rounded, as shown in the drawing, said rounded portion having a squared termination.

Bearing rotatably in the downturned member of the arm 8 is a horizontal shaft 9, the inner end portion of the latter extending loosely through an opening in the plate 6ª, thence into the wheel 1. Within the body of the wheel 1 and upon the shaft 9 is carried a disk 10, which has formed in its periphery, the desired number of radial sockets 11. Surrounding the disk 10 is a gear ring 12 the inner surface of said gear ring being formed with tangentially curved notches which terminate in straight or radial shoulders, said notches being indicated at 13. Within each of the sockets 11 is contained a spring 14 and against each of these springs bears the inner end of a pawl or pin 15, the outwardly projecting portion of each of which is formed with one straight and one curved face, as shown. As will be understood, the straight faces of the outwardly projecting portions of the spring actuated pawls or pins 15 are adapted to engage the shoulder terminations of the notches 13, when the wheel 1 is run forward.

Upon the outer reduced end of the shaft 9 on the outer side of the arm 8, is carried a bevel pinion 16. Upon the rounded lower portion of the downwardly extending member of the arm 8 is detachably and rotatably mounted, the central or body portion 17 of a cutting device, which body has formed with its upper side, bevel gear teeth 17ª, which teeth are adapted to gear with those of the bevel pinion 16. The cutter body 17 has formed with its lower portion a plurality of horizontal radially arranged cutter blades 18, each having one of its longer edges properly beveled or sharpened. Upon the squared lower end of the downwardly extending member of the arm 8 is carried the slightly elevated inner end or head of a horizontally extending cutter bar 19, said cutter bar being thus supported below the rotary path of the blades 18 or in shearing relation to the latter. The cutter bar is held in place by a nut 20 which is screwed upon the threaded extension of the squared terminal member of the arm 8.

When the wheel 1 is pushed forwardly, it is obvious that the engagement of the teeth of the gear ring 12 with the internal gear teeth 2 of the wheel 1, will result in imparting rotary motion to said gear ring and through the engagement of the internal shoulders of the latter, with the straight faces of the outwardly projecting portions of the pawls 15, in a corresponding rotation of the disk 10, shaft 9 and bevel pinion 16. The gear connection of the pinion 16 and the bevel teeth of the cutting device, produces the desired rotary motion of said cutting device, causing the knife members 18, to shear past the outwardly projecting cutter bar 19, thus severing or cutting the grass which is brought into contact with said cutter bar. When the ground wheel is run backward, the operation of the cutting device is discontinued, owing to the fact that the motion of the gear ring 12 is reversed and the contact of the curved faces of the pawls 15 with the curved surfaces of the notches 13, will force said pawls successively within their sockets and prevent an operative engagement of the pawls with the notch shoulders of the gear ring.

It will be understood that in case it is desired to substitute a cutting device with shorter or longer blades or to substitute a shorter or longer cutter bar, it is only necessary to remove the nut 20, withdraw the cutter bar and cutting device, and substitute others therefor.

It will be observed that my improved lawn trimmer is simple of construction, formed of comparatively few parts and may be readily utilized in the cutting or trimming of lawns in places where the ordinary lawn mower, owing to its construction, cannot be utilized.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

What I claim, is:

In a lawn trimmer, the combination with a ground wheel having internal gear teeth, a handle, and bars extending from said handle on opposite sides of said ground wheel and pivotally connected with the latter, one of said bars having an outwardly and thence downwardly extending arm, of a horizontal shaft journaled in said arm and extending within said ground wheel, a gear ring within said ground wheel, a connection between said gear ring and said shaft, a pinion on the outer end of said shaft, a cutting device rotatably mounted on said bar arm and having a gear connection with said latter pinion, and a cutter bar having a nonrotatable connection with said bar arm.

In testimony whereof I affix my signature in presence of two witnesses.

FRANK C. REYNOLDS.

Witnesses:
L. CARL STOUGHTON,
A. L. PHELPS.